UNITED STATES PATENT OFFICE 2,263,663

MINERAL OIL COMPOSITION

Jones I. Wasson, Union, and Warren M. Smith, Elizabeth, N. J., assignors to Standard Oil Development Company, a corporation of Delaware No Drawing. Application January 25, 1940, Serial No. 315,520

8 Claims. (Cl. 252—52)

The present invention relates to an improved mineral oil composition. The invention is particularly concerned with an improved petroleum oil composition comprising a petroleum oil and a relatively small amount of a substance selected from the class of tertiary alkyl aromatic monoethers which are characterized by having at least two alkyl groups attached directly to the aromatic nucleus and which are further characterized in that said groups have a hydrogen atom attached directly to the carbon atom which is attached to the aromatic nucleus.

It is well known in the art to utilize various organic compounds in order to improve the general quality and various characteristics of petroleum oils, particularly petroleum lubricating oils. For example, it is known to employ phenolic type substances in petroleum lubricating oils in order to inhibit the oils against oxidation and other forms of deterioration and to better adapt the oils for severe working conditions under which they may be employed. Lubricating oils and the like, for example, at the elevated temperatures and pressures prevailing in internal combustion engines, tend to oxidize and form reaction products. These reaction products are extremely undesirable in that they impair the lubricating effect of the oil, tend to corrode the metallic parts and form sludge-like and other deleterious materials. We have now discovered a class of substances which are particularly adapted for improving the quality of petroleum oils. The substances of our invention when used in relatively small amounts will greatly increase the ability of the oil to withstand for long time periods severe working conditions as measured by relatively high temperatures and pressures without any substantial amount of deterioration of the oil occurring.

The inhibitors of our invention are selected from the class of tertiary alkyl aromatic monoethers which are characterized by having at least two alkyl groups attached directly to the aromatic nucleus and which are further characterized in that said groups have a hydrogen atom attached directly to the carbon atom which is attached to the aromatic nucleus. This class of substances may be represented by the following structural formula:

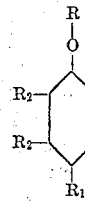

in which R represents a tertiary alkyl group, $R_1$ represents a primary or secondary alkyl group, and $R_2$ represents either hydrogen, a primary or secondary alkyl group. Particular compounds selected from this class of substances are, for example, tertiary butyl ether of ortho secondary butyl para cresol, tertiary hexyl ether of ortho secondary butyl para cresol, tertiary butyl ether of ortho normal butyl para cresol, tertiary amyl ether of ortho normal butyl para cresol, tertiary butyl ether of ortho secondary amyl para cresol, tertiary butyl ether of ortho secondary butyl para ethyl phenol, tertiary butyl ether of ortho secondary butyl para isopropyl phenol, tertiary butyl ether of ortho secondary butyl para normal butyl phenol, tertiary butyl ether of ortho secondary butyl para isobutyl phenol, tertiary butyl ether of ortho normal butyl para hexyl phenol, tertiary butyl ether of ortho normal amyl para ethyl phenol, tertiary amyl ether of ortho secondary butyl para isobutyl phenol, tertiary butyl ether of ortho secondary amyl para isobutyl phenol, and the like. Preferred inhibitors are those which contain 4 to 5 carbon atoms in the tertiary alkyl group attached through the ether linkage to the aromatic group and in which two alkyl groups as defined are attached directly to the aromatic nucleus in the ortho and para positions. Particularly preferred compounds of the present invention are those in which the alkyl group attached in the ortho position is a secondary alkyl group and the alkyl group attached in the para position is a primary alkyl group. When employing a compound of this character it is also preferred that the alkyl group attached in the para position contain at least 2, preferably 3 to 6, carbon atoms in the molecule. Substances of this character are, for example, tertiary butyl ether of ortho secondary butyl para ethyl phenol, tertiary amyl ether of ortho secondary butyl para isobutyl phenol, and tertiary butyl ether of ortho secondary amyl para isobutyl phenol.

The inhibitors of the present invention may be added to any mineral oil in order to improve the quality and desirable properties of said oil. They are, however, particularly adapted for utilization in petroleum oils which are to be subjected to working conditions employing elevated temperatures and pressures. The inhibitor may be added to the oil in any desired quantity, depending upon the particular substance used and upon the character of the particular base oil to which it is added, as well as upon the working conditions to which said base oil is to be subjected. The quantity of inhibitor added may vary widely in the range from about 0.01% to 2% or 3%. However, in general, it is preferred to employ from about 0.05% to 0.3%. For example, when employing tertiary butyl ether or ortho secondary butyl para cresol, it is preferred to use about 0.1%.

In order to further illustrate the invention, the following example is given which should not be construed as limiting the invention in any manner whatsoever.

Additional tests were run using related compounds other than those of the present invention. The results of these tests were as follows:

| | Hours 0 | | Hours 100 | | Hours 200 | |
|---|---|---|---|---|---|---|
| | Color | Neut. No. | Color | Neut. No. | Color | Neut. No. |
| Petroleum oil+0.1% of methyl ether of phenol | 17 | 0.03 | 5 | 0.30 | Black | |
| Petroleum oil+secondary butyl ether of phenol | 17 | 0.03 | 5 | 0.30 | ---do--- | |
| Petroleum oil+methyl ether of para cresol | 17 | 0.03 | 5 | 0.30 | ---do--- | |
| Petroleum oil+secondary butyl ether of para cresol | 17 | 0.03 | 5 | 0.30 | ---do--- | |
| Petroleum oil+normal butyl ether of ortho tertiary butyl para cresol | 17 | 0.03 | 7 | 0.20 | ---do--- | |
| Petroleum oil+secondary butyl ether of ortho tertiary butyl para cresol | 17 | 0.03 | 7 | 0.20 | ---do--- | |
| Petroleum oil+methyl ether of ortho tertiary butyl para cresol | 17 | 0.03 | 7 | 0.20 | | |
| Petroleum oil+ethyl ether of ortho tertiary butyl para cresol | 17 | 0.03 | 7 | 0.20 | | |
| Petroleum oil+isopropyl ether of ortho tertiary butyl para cresol | 17 | 0.03 | 7 | 0.20 | | |
| Petroleum oil+cetyl ether of para cresol | 17 | 0.03 | 9 | 0.18 | Black | |
| Petroleum oil+methyl ether of ortho secondary butyl para cresol | 17 | 0.03 | 7 | 0.20 | ---do--- | |
| Petroleum oil+secondary butyl ether of ortho secondary butyl para cresol | 17 | 0.03 | 8 | 0.12 | 6 | .20 |
| Petroleum oil+secondary butyl ether of ortho secondary butyl para secondary butyl phenol | 17 | 0.03 | 8 | 0.18 | Black | |
| Petroleum oil+0.1% isobutyl ether of o-tertiary butyl p-cresol | 17 | 0.03 | 6 | 0.25 | | |

*Example*

A petroleum oil having the following inspections:

Gravity _____ 33.5° A. P. I.
Flash _____ 425° F.
Saybolt Universal vis./100° F _____ 155
Robinson color _____ 17 was blended with 0.1% of various substances and tested in order to determine the susceptibility of the blend toward oxidation and deterioration. The oxidation tendency of the oil was measured by the Staeger oxidation test *. The results of these tests were as follows:

* Staeger oxidation test: 200 ccs. of oil are placed in a 400 ccs. beaker and maintained at a temperature of 110° C. in the presence of a metallic copper catalyst for various time periods. The color of the oil is observed and the product neutralized in order to determine the quantity of acidic materials formed. The color was measured by the Tag Robinson colorimeter. The neutralization number is equivalent to milligrams of potassium hydroxide per gram of oil.

| | Hours 0 | | Hours 100 | | Hours 200 | | Hours 300 | | Hours 450 | |
|---|---|---|---|---|---|---|---|---|---|---|
| | Color | Neut. No. | Color | Neut. No. | Color | Neut. No. | Color | Neut. No. | Color | Neut. No. |
| Petroleum oil | 17 | 0.03 | 5 | 0.30 | Black | | | | | |
| Petroleum oil+0.1% tertiary butyl ether of o-ethyl p-cresol | 17 | 0.03 | 17 | 0.03 | | | 12 | 0.09 | 5 | 0.30 |
| Petroleum oil+0.1% tertiary butyl ether of o-secondary butyl p-cresol | 17 | 0.03 | 17 | 0.03 | | | 9 | 0.15 | 4 | 0.35 |

From the above data it is apparent that substantially no deterioration of the petroleum oil occurred over a period of 450 hours when utilizing as inhibitors substances of the present invention.

Further tests were conducted with the following results:

| | Hours 0 | | Hours 100 | | Hours 200 | |
|---|---|---|---|---|---|---|
| | Color | Neut. No. | Color | Neut. No. | Color | Neut. No. |
| Petroleum oil+ortho ethyl para cresol | 17 | 0.03 | 10 | 0.10 | 7 | 0.24 |
| Petroleum oil+ortho secondary butyl para cresol | 17 | 0.03 | 9 | 0.12 | 6 | 0.30 |

From the above it is readily apparent that the corresponding phenols are not satisfactory.

From the above data it is apparent that little or no improvement is secured by the use of compounds of this character.

It is to be understood that although the substances of the present invention are particularly adapted for improving the quality of petroleum lubricating oils, they likewise may be employed for the stabilization of petroleum hydrocarbons generally against oxidation, deterioration, and the like, as for example, for the stabilization of petrolatums, petroleum waxes, motor fuels, and the like, as well as for the stabilization of various vegetable and animal oils.

The process of the present invention is not to be limited by any theory or mode of operation, but only in and by the following claims in which it is desired to claim all novelty in so far as the prior art permits.

We claim:

1. Composition comprising an oil and a relatively small amount of a tertiary alkyl aromatic mono-ether having at least two alkyl groups attached directly to the aromatic nucleus and being characterized in that said groups have a hydrogen atom attached directly to the carbon atom which is attached to the aromatic nucleus.

2. Composition comprising a petroleum hydrocarbon and a relatively small amount of a tertiary alkyl aromatic mono-ether having at least two alkyl groups attached directly to the aromatic nucleus and being characterized in that said groups have a hydrogen atom attached directly to the carbon atom which is attached to the aromatic nucleus.

3. Composition in accordance with claim 2 in which one of said alkyl groups attached directly to the aromatic nucleus comprises a secondary group.

4. Composition in accordance with claim 2 in which the tertiary alkyl group contains from 4 to 5 carbon atoms in the molecule.

5. Composition in accordance with claim 2 in which the tertiary alkyl group contains from 4 to 5 carbon atoms in the molecule and in which one of said alkyl groups attached directly to the aromatic nucleus is a secondary group.

6. Composition in accordance with claim 2 in which said ether is tertiary butyl ether of ortho ethyl para cresol.

7. Composition in accordance with claim 2 in which said ether is tertiary butyl ether of ortho secondary butyl para cresol.

8. Oil composition having a high resistan against oxidation comprising a petroleum boiling in the lubricating oil range and a rel tively small amount of a tertiary alkyl aromat mono-ether having at least two alkyl groups a tached directly to the aromatic nucleus and bei characterized in that said groups have a hydr gen atom attached directly to the carbon ato which is attached to the aromatic nucleus.

JONES I. WASSON.
WARREN M. SMITH.